United States Patent
Perez

(10) Patent No.: US 11,836,667 B2
(45) Date of Patent: *Dec. 5, 2023

(54) CONNECTION-BASED OR COMMUNICATION-BASED SERVICES AND DETERMINATIONS

(71) Applicant: United Parcel Service of America, Inc., Atlanta, GA (US)

(72) Inventor: Juan Perez, Milton, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/848,717

(22) Filed: Jun. 24, 2022

(65) Prior Publication Data
US 2022/0318721 A1 Oct. 6, 2022

Related U.S. Application Data

(63) Continuation of application No. 17/120,751, filed on Dec. 14, 2020, now Pat. No. 11,367,037, which is a continuation of application No. 14/933,311, filed on Nov. 5, 2015, now Pat. No. 10,878,362.

(51) Int. Cl.
G06Q 10/083 (2023.01)

(52) U.S. Cl.
CPC .................... G06Q 10/083 (2013.01)

(58) Field of Classification Search
CPC .................................................. G06Q 10/083
See application file for complete search history.

(56) References Cited

U.S. PATENT DOCUMENTS

| | | | |
|---|---|---|---|
| 6,975,998 B1* | 12/2005 | Jones | G06Q 10/08 700/214 |
| 7,212,829 B1* | 5/2007 | Lau | H04L 67/52 340/8.1 |
| 8,368,562 B2* | 2/2013 | Horstemeyer | G06Q 30/0259 340/995.11 |
| 9,699,606 B1* | 7/2017 | Bhatia | G06Q 10/083 |
| 2007/0005452 A1* | 1/2007 | Klingenberg | G06Q 50/32 705/334 |
| 2007/0171910 A1 | 7/2007 | Kumar | |
| 2007/0203741 A1* | 8/2007 | Ordille | G06Q 10/00 705/345 |
| 2008/0301580 A1* | 12/2008 | Hjelmeland Alams | H04L 51/222 715/808 |

(Continued)

OTHER PUBLICATIONS

Systems, K., 2015. Mobiletek—Mobile Driver Management Tools Set. [online] Key Software Systems. Available at: < https://www.keysoftwaresystems.com/mobiletek.html> (Year: 2015).*

(Continued)

*Primary Examiner* — Shannon S Campbell
*Assistant Examiner* — Manal A. Alsamiri
(74) *Attorney, Agent, or Firm* — SHOOK, HARDY & BACON L.L.P.

(57) ABSTRACT

Computer program products, methods, systems, apparatus, and computing entities are provided. In one embodiment, computing entities can establish direct communications with one another using a variety of protocols and standards. Such direction communications can be monitored or attempted to be established to determine whether an item is allowed or disallowed for delivery.

20 Claims, 8 Drawing Sheets

(56) References Cited

U.S. PATENT DOCUMENTS

| | | | |
|---|---|---|---|
| 2011/0074587 A1* | 3/2011 | Hamm | G06Q 10/0833 |
| | | | 340/673 |
| 2012/0171961 A1* | 7/2012 | Qi | H04L 63/0869 |
| | | | 455/41.2 |
| 2012/0242589 A1 | 9/2012 | Schmidt et al. | |
| 2012/0246077 A1* | 9/2012 | Skaaksrud | G06Q 30/0615 |
| | | | 705/50 |
| 2013/0138573 A1* | 5/2013 | Klingenberg | G06Q 50/28 |
| | | | 705/330 |
| 2015/0120529 A1* | 4/2015 | Faaborg | G06Q 10/083 |
| | | | 705/330 |
| 2015/0178678 A1 | 6/2015 | Carr et al. | |
| 2016/0048796 A1* | 2/2016 | Todasco | H04W 12/06 |
| | | | 705/330 |
| 2017/0132558 A1 | 5/2017 | Perez | |
| 2018/0247252 A1* | 8/2018 | Duquene | H04L 9/3247 |
| 2019/0311327 A1* | 10/2019 | Habbaba | H04W 12/06 |
| 2021/0133664 A1 | 5/2021 | Perez | |

OTHER PUBLICATIONS

Mobiletek—Mobile Driver Management Tools Set, Systems,K., Key Software Systems Available online at: < https://www.keysoftwaresystems.com/mobiletek.html>, 2015, 1 page.

Azen et al., "Multifactor Authentication based on User Contextual", W3C Workshop on Authentication, Hardware Tokens and Beyond, Available Online at: https://www.w3.org/2012/webcrypto/webcrypto-next-workshop/papers/webcrypto2014_submission_29.pdf, Sep. 11, 2014, pp. 1-3.

* cited by examiner

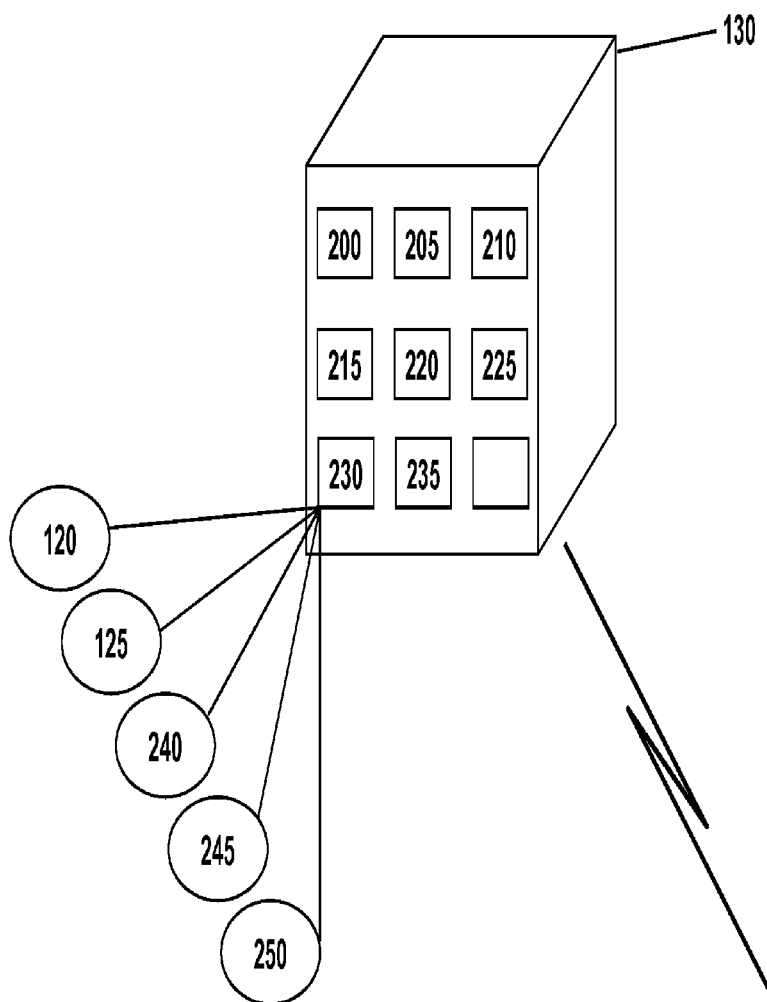
Fig. 2
105 / 110 / 115 / 116
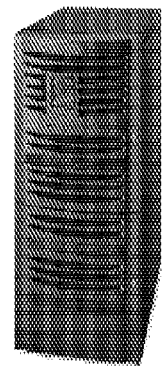
105 / 110 / 115 / 116

| Configurable Parameters Smith Co. Automotive - 101 Main Street, Anytown, GA 11111 | | | | | |
|---|---|---|---|---|---|
| Event | Location | Days | Time | Entity / Location | Entity / Location |
| Deliveries | Warehouse Dock | Monday - Friday | 9:00am - 6:00pm | Any Employee Mobile | John Smith's Mobile |
| Deliveries | Front Door | Monday - Friday | 6:01pm - 8:59am | John Smith's Mobile | - |
| Deliveries | Front Door | Saturday - Sunday | All Day | John Smith's Mobile | - |

Fig. 6

CONNECTION-BASED OR COMMUNICATION-BASED SERVICES AND DETERMINATIONS

CROSS REFERENCE TO RELATED APPLICATIONS

This application, is a continuation U.S. application Ser. No. 17/120,751, Filed on Dec. 14, 2020 which is a continuation of U.S. application Ser. No. 14/933,311, filed on Nov. 5, 2015, and entitled, "Connection-Based or Communication-Based Services and Determinations," the entirety each of which is hereby expressly incorporated by reference in its entirety.

BACKGROUND

With an ever-increasing need for mobility and flexibility in item pick-up and item delivery contexts, new techniques and approaches are needed to make such pick-ups and deliveries as efficient as possible.

BRIEF SUMMARY

In general, embodiments of the present invention provide methods, apparatus, systems, computing devices, computing entities, and/or the like for connection-based services and determinations.

In accordance with one aspect, a method is provided. In one embodiment, the method comprises (1) determining whether to allow delivery of an item based at least in part on a first computing entity and a second computing entity being in direct communication with each other; and (2) responsive to determining to allow delivery of the item based at least in part on the first computing entity and the second computing entity being in direct communication with each other, providing a notification for display indicating that the item is allowed to be delivered.

In accordance with another aspect, a computer program product is provided. The computer program product may comprise at least one non-transitory computer-readable storage medium having computer-readable program code portions stored therein, the computer-readable program code portions comprising executable portions configured to (1) determine whether to allow delivery of an item based at least in part on a first computing entity and a second computing entity being in direct communication with each other; and (2) responsive to determining to allow delivery of the item based at least in part on the first computing entity and the second computing entity being in direct communication with each other, provide a notification for display indicating that the item is allowed to be delivered.

In accordance with yet another aspect, an apparatus comprising at least one processor and at least one memory including computer program code is provided. In one embodiment, the at least one memory and the computer program code may be configured to, with the processor, cause the apparatus to (1) determine whether to allow delivery of an item based at least in part on a first computing entity and a second computing entity being in direct communication with each other; and (2) responsive to determining to allow delivery of the item based at least in part on the first computing entity and the second computing entity being in direct communication with each other, provide a notification for display indicating that the item is allowed to be delivered.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is a diagram of an information/data collection device that may be used in association with certain embodiments of the present invention.

FIGS. 6-8 are exemplary input and output produced in accordance with various embodiments of the present invention.

DETAILED DESCRIPTION

Figure 1:
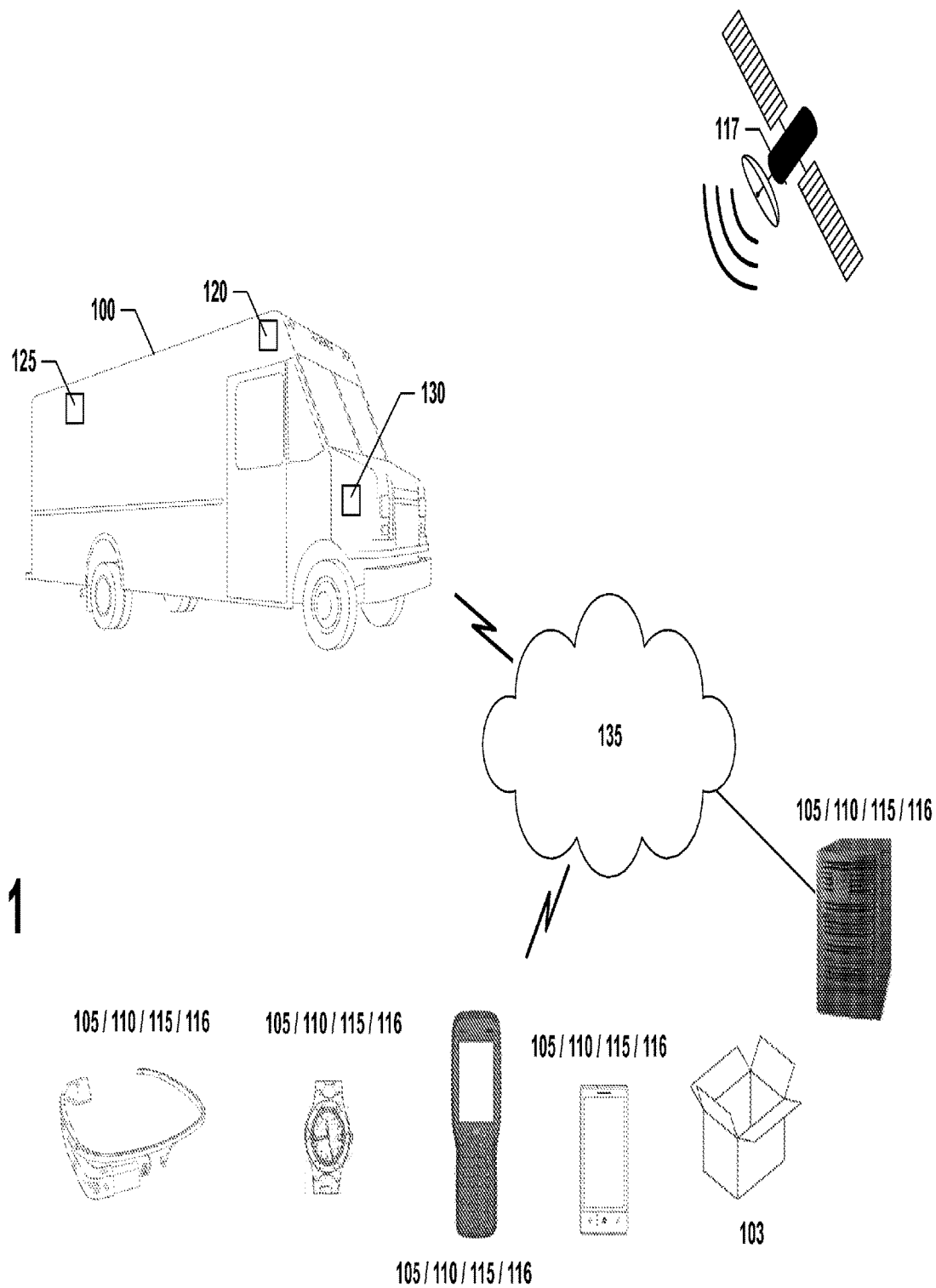
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD- ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a system that can be used in conjunction with various embodiments of the present invention. As shown in FIG. 1, the system may include one or more vehicles 100, one or more items 103, one or more carrier computing systems 105, one or more customer computing entities 110, one or more carrier personnel computing entities 115, one or more Global Positioning System (GPS) satellites 117, one or more location sensors 120, one or more telematics sensors 125, one or more information/data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

1. Exemplary Vehicle

In various embodiments, the term vehicle 100 is used generically. In one embodiment, a vehicle may be a carrier vehicle, such as a manned or an unmanned tractor, a truck, a car, a motorcycle, a moped, a Segway, a bicycle, a golf cart, a hand truck, a cart, a trailer, a tractor and trailer combination, a van, a flatbed truck, a vehicle, a drone, an aerial vehicle, an airplane, a helicopter, a barge, a boat, and/or any other form of object for moving or transporting people and/or items (e.g., one or more packages, parcels, bags, containers, loads, crates, items banded together, vehicle parts, pallets, drums, the like, and/or similar words used herein interchangeably). Further, a vehicle may be a customer vehicle and/or the like. In one embodiment, each vehicle 100 may be associated with a unique vehicle identifier (such as a vehicle ID) that uniquely identifies the vehicle 100. The unique vehicle ID may include characters, such as numbers, letters, symbols, and/or the like. For example, an alphanumeric vehicle ID (e.g., "AS445" and/or "1G6AF5SX6D0125409") may be associated with each vehicle 100. In another embodiment, the unique vehicle ID may be the license plate, registration number, or other identifying information/data assigned to the vehicle 100.

FIG. 1 shows one or more computing entities, devices, and/or similar words used herein interchangeably that are associated with the vehicle 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a vehicle 100. The information/data collection device 130 may collect telematics information/data (including location data) and transmit/send the information/data to various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 100 but external to the information/data collection device 130.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 117, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (CARRIER) coordinate systems; and/or the like. Alternatively, triangulation may be used in connection with a device associated with a particular vehicle 100 and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with a variety of computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from vehicle systems and sensors. The ECM 245 may further have information/data processing capability to collect and present telematics information/data to the J-Bus (which may allow transmission to the information/data collection device 130), and output standard vehicle diagnostic codes when received from a vehicle's J-Bus-compatible on-board controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

2. Exemplary Item

In one embodiment, an item 103 may be any tangible and/or physical object. In one embodiment, an item 103 may be or be enclosed in one or more packages, envelopes, parcels, bags, goods, products, containers, loads, crates, items banded together, vehicle parts, pallets, drums, the like, and/or similar words used herein interchangeably. In one embodiment, each item 103 may include and/or be associated with an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. A unique item/shipment identifier (e.g., 123456789) may be used by the carrier to identify and track the item 103 as it moves through the carrier's transportation network. Further, such item/shipment identifiers can be affixed to items 103 by, for example, using a sticker (e.g., label) with the unique item/shipment identifier printed thereon (in human and/or machine readable form) or an RFID tag with the unique item/shipment identifier stored therein. Such items may be referred to as "connected" items 103 and/or "non-connected" items 103.

In one embodiment, connected items 103 include the ability to determine their locations and/or communicate with various computing entities. This may include the item 103 being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected items 103 may include one or more components that are functionally similar to those of the carrier computing system 105 and/or the customer computing entity 110 as described below. For example, in one embodiment, each connected item 103 may include one or more processing elements, one or more display device/input devices (e.g., including user interfaces), volatile and non-volatile storage or memory, and/or one or more communications interfaces. In this regard, in some example embodiments, an item 103 may communicate send "to" address information/data, received "from" address information/data, unique identifier codes, location information/data, status information/data, and/or various other information/data.

In one embodiment, non-connected items 103 do not typically include the ability to determine their locations and/or might not be able communicate with various computing entities or are not designated to do so by the carrier. The location of non-connected items 103 can be determined with the aid of other appropriate computing entities. For example, non-connected items 103 can be scanned (e.g., affixed barcodes, RFID tags, and/or the like) or have the containers or vehicles in which they are located scanned or located. As will be recognized, an actual scan or location determination of an item 103 is not necessarily required to determine the location of an item 103. That is, a scanning operation might not actually be performed on a label affixed directly to an item 103 or location determination might not be made specifically for or by an item 103. For example, a label on a larger container housing many items 103 can be scanned, and by association, the location of the items 103 housed within the container are considered to be located in the container at the scanned location. Similarly, the location of a vehicle 100 transporting many items can be determined, and by association, the location of the items 103 being transported by the vehicle 100 are considered to be located in the vehicle 100 at the determined location. These can be referred to as "logical" scans/determinations or "virtual" scans/determinations. Thus, the location of the items 103 is based on the assumption they are within the container or vehicle 100, despite the fact that one or more of such items 103 might not actually be there.

3. Exemplary Carrier Computing System

Figure 3:
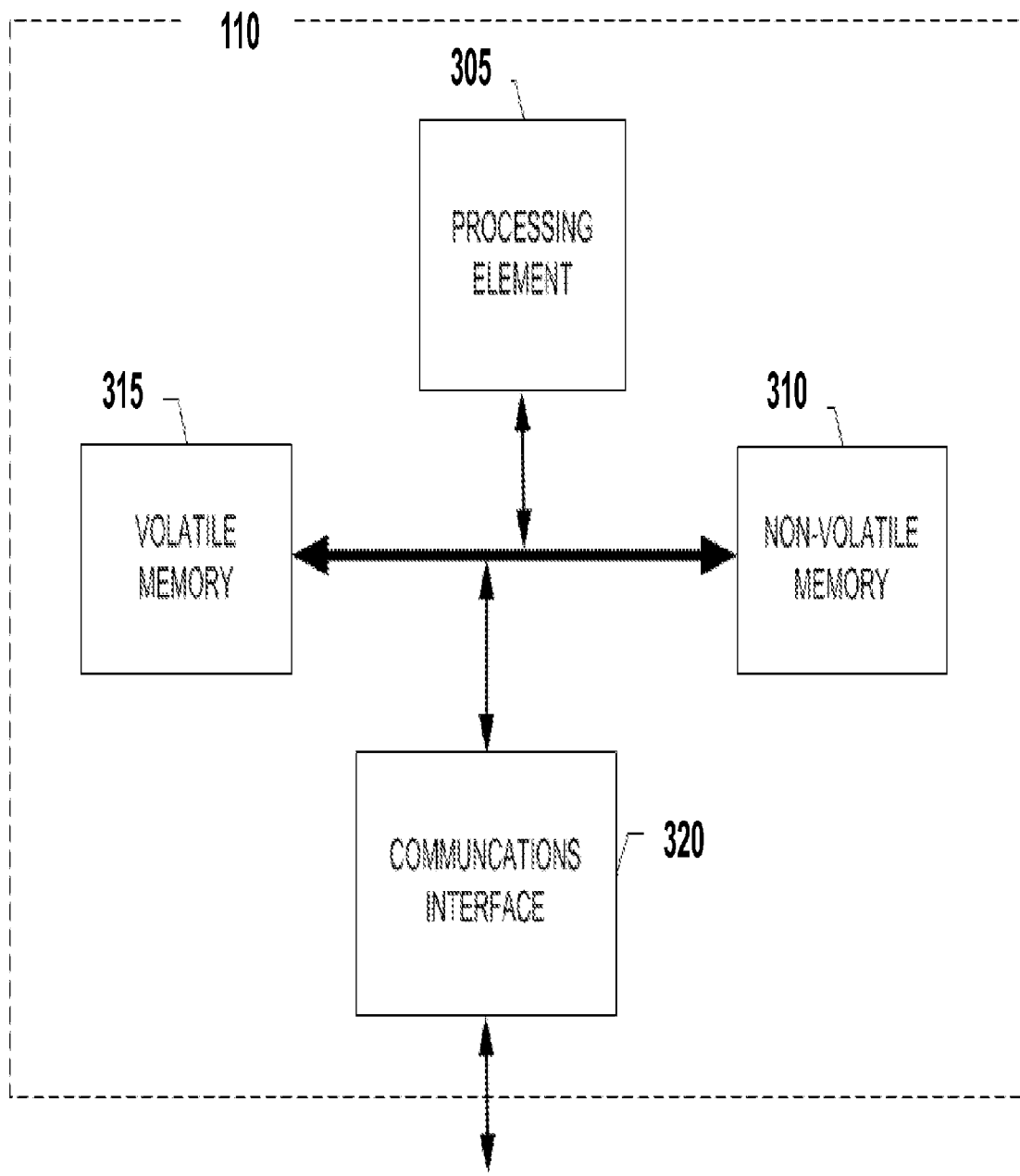
FIG. 3 is a schematic of a carrier computing system in accordance with certain embodiments of the present invention.

FIG. 3 provides a schematic of a carrier computing system 105 according to one embodiment of the present invention. A carrier may be a traditional carrier, such as United Parcel Service, FedEx, DHL, courier services, the United States Postal Service (USPS), Canadian Post, freight companies (e.g., truck-load, less-than-truckload, rail carriers, air carriers, ocean carriers, etc.), and/or the like. However, a carrier may also be a nontraditional carrier, such as Amazon, Google, Apple, Uber, ride-sharing services, crowd-sourcing services, retailers, and/or the like. A carrier computing system 105 may be located at a carrier location and/or the like, such as a carrier service center, will call, kiosk, drop-box, locker system, hub, facility, and/or the like. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing system 105 may also include one or more communications interfaces 320 for communicating with various computing entities, such as by communicating data, content, information, and/or similar terms used herein interchangeably that can be transmitted, received, operated on, processed, displayed, stored, and/or the like. The carrier computing system 105 can also be used for making, receiving, and/or transferring payments. Payments may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Android Pay, Booker, Erply, Leaf, Apple Pay, Leapset, Micros, PayPal Here, Revel, ShopKeep, TouchBistro, Vend, and/or the like.

As shown in FIG. 3, in one embodiment, the carrier computing system 105 may include or be in communication with one or more processing elements 305 (also referred to as processors, processing circuitry, and/or similar terms used herein interchangeably) that communicate with other elements within the carrier computing system 105 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier computing system 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the carrier computing system 105 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the carrier computing system 105 with the assistance of the processing element 305 and operating system.

As indicated, in one embodiment, the carrier computing system 105 may also include one or more communications interfaces 320 for communicating with various computing entities, such as by communicating data, content, information, and/or similar terms used herein interchangeably that can be transmitted, received, operated on, processed, displayed, stored, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing system 105 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier computing system 105 may include or be in communication with one or more input elements, such as a keyboard input, a mouse input, a touch screen/display input, audio input, pointing device input, joystick input, keypad input, and/or the like. The carrier computing system 105 may also include or be in communication with one or more output elements (not shown), such as audio output, video output, screen/display output, motion output, movement output, and/or the like.

As will be appreciated, one or more of the carrier computing system's 105 components may be located remotely from other carrier computing system 105 components, such as in a distributed system. Furthermore, one or more of the components may be combined and additional components performing functions described herein may be included in the carrier computing system 105. Thus, the carrier computing system 105 can be adapted to accommodate a variety of needs and circumstances.

4. Exemplary Customer Computing Entity

Figure 4:
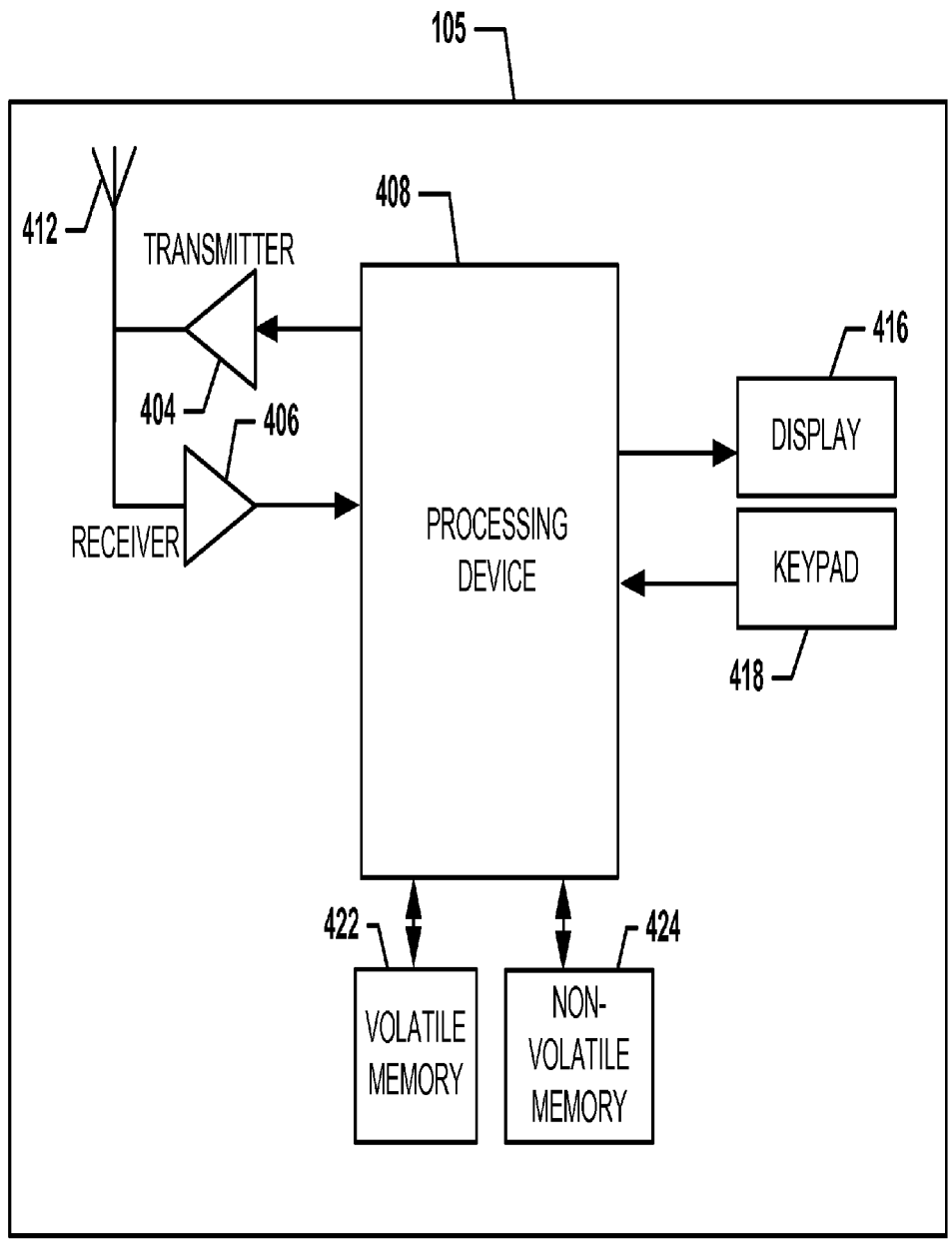
FIG. 4 is a schematic of a customer computing entity in accordance with certain embodiments of the present invention.

A customer may be an individual, a family, a family member, a company, an organization, an entity, a department within an organization, a representative of an organization and/or person, and/or the like. Depending on the context, customers may be consignors and/or consignees. Accordingly, the term customer may refer to both consignors and/or consignees interchangeably. FIG. 4 provides an illustrative schematic representative of a customer computing entity 110 that can be used in conjunction with embodiments of the present invention. In one embodiment, the customer computing entities 110 may include one or more components that are functionally similar to those of the carrier computing system 105 and/or as described below. As shown in FIG. 4, a customer computing entity 110 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, carrier computing systems 105, and/or the like. In this regard, the customer computing entity 110 may be capable of operating with one or more air interface standards, communication protocols, modulation types, and access types. More particularly, the customer computing entity 110 may operate in accordance with any of a number of wireless communication standards and protocols. In a particular embodiment, the customer computing entity 110 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the customer computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The customer computing entity 110 can also download changes, add-ons, and updates, for instance, to its firmware, software (e.g., including executable instructions, applications, program modules), and operating system. For example, in one embodiment, the customer computing entity 110 may store and execute a carrier application to assist in communicating with the carrier and/or for providing location services regarding the same.

According to one embodiment, the customer computing entity 110 may include location determining aspects, devices, modules, functionalities, and/or similar words used herein interchangeably. For example, the customer computing entity 110 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the customer computing entity's 105 position in connection with a variety of other systems, including cellular towers, Wi-Fi access points, and/or the like. Similarly, the customer computing entity 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The customer computing entity 110 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the customer computing entity 110 to interact with and/or cause display of information. The user input interface can comprise any of a number of devices allowing the customer computing entity 110 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the customer computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the customer computing entity can collect contextual information/data as part of the telematics data.

The customer computing entity 110 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the customer computing entity 110.

5. Exemplary Carrier Personnel Computing Entity

As will be recognized, carrier personnel computing entities 115 can be operated by various parties, including a carrier pick-up/delivery person and/or operators of vehicles 100. For example, a user may be a carrier pick-up/delivery person picking up items from and/or delivering items to customers. Moreover, a carrier personnel computing entity 115 may include one or more components that are functionally similar to those of the carrier computing system 105 and/or the customer computing entity 110. For example, in one embodiment, each carrier personnel computing entity 115 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the carrier personnel computing entity 115 to interact with and/or cause display of information from various other computing entities. As will be recognized, these architectures and descriptions are provided for exemplary purposes only and are not limiting to the various embodiments.

III. EXEMPLARY SYSTEM OPERATION

Figure 5:
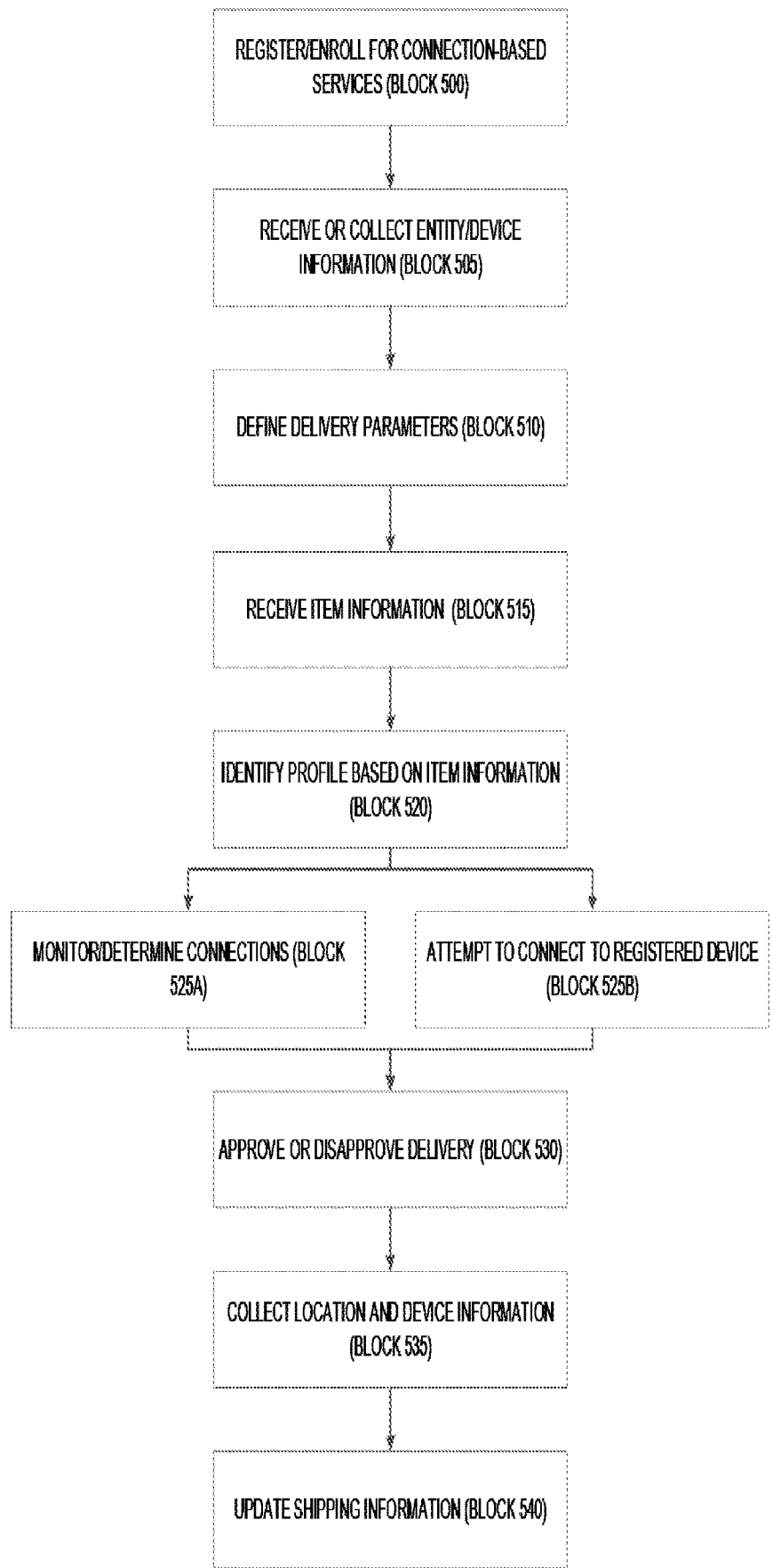
FIG. 5 is a flowchart illustrating operations and processes that can be used in accordance with various embodiments of the present invention.
Figure 7:
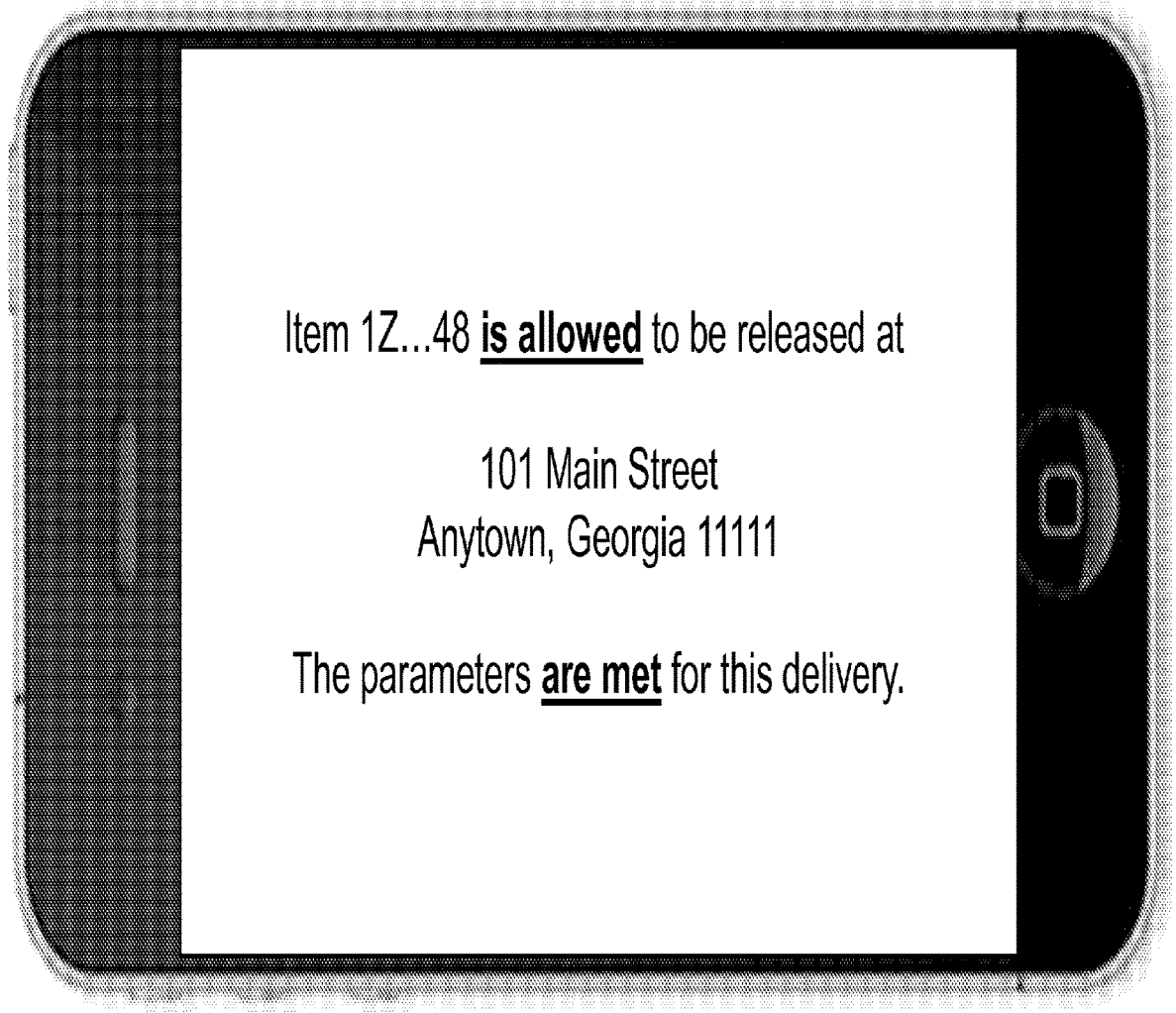
Figure 8:
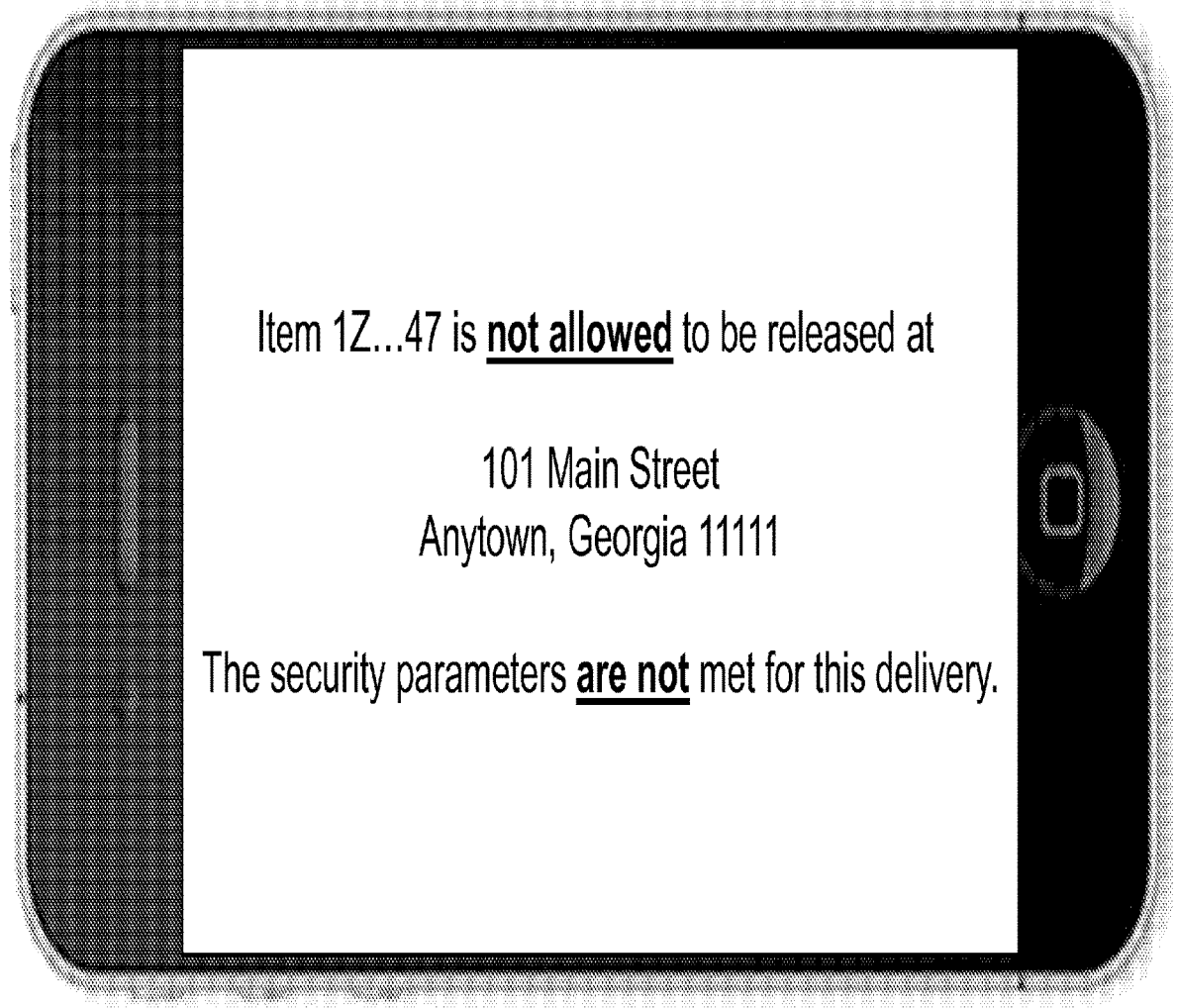

Reference will now be made to FIGS. 5-8. FIG. 5 is a flowchart illustrating operations and processes that can be used in accordance with various embodiments of the present invention. FIGS. 6-8 are exemplary input and output produced in accordance with various embodiments of the present invention.

1. Registration

In one embodiment, as indicated in Block 500 of FIG. 5, the process may begin with the enrollment/registration of one or more customers (e.g., consignors and/or consignees) for an account, subscription, program, and/or similar words used herein interchangeably for connection-based services. In another embodiment, the customer may be automatically enrolled/registered for the same. As previously noted, a customer may be an individual, a family, a family member, a company, an organization, an entity, a department within an organization, a representative of an organization and/or person, and/or the like. To register, a customer (e.g., a customer operating a customer computing entity 110) may access a webpage, mobile application, application, dashboard, browser, or portal of an entity that provides notification/message services.

In one embodiment, as part of the enrollment/registration process, a customer (e.g., a customer operating a customer computing entity 110) may be requested to provide information/data (e.g., including customer information/data, biographic information/data, geographic information/data, device/entity information/data, payment information/data, and/or the like) by the carrier computing system 105 (e.g., via the registration module). The information/data may be manually input by a customer; may be automatically provided by allowing access to other accounts, such as Amazon.com, Facebook, Gmail, Twitter, PayPal, and/or the like; may be automatically collected by various computing entities (including automatic device identification); combinations thereof; and/or other techniques and approaches. For instance, the biographic information/data may include the customer's name, such as a first name, a last name, a company name, an entity name, an organization name, and/or the like. The geographic information/data may also include one or more physical addresses or locations associated with the customer (e.g., street address, city, state, postal code, and/or country). The physical addresses or locations may be residential addresses, commercial addresses, geocodes, latitude and longitude points, virtual addresses, and/or the like. In one embodiment, the customer information/data may include one or more electronic signatures and signature formats for electronically signing documents, releases, and/or the like.

In one embodiment, the customer information/data may include one or more communication formats for communicating with the customer as part of his or her notification/message preferences. The communication formats may include text notifications/messages (e.g., SMS, MMS), email notifications/messages, voice notifications/messages, video notifications/messages (e.g., YouTube, the Vine), picture notifications/messages (e.g., Instagram), social media notifications/messages (e.g., private social media created internally for entities, business social media (e.g., Yammer, SocialCast), or public social media (e.g., Facebook, Instagram, Twitter), and/or a variety of other notifications/messages in various communication formats. In addition to the one or more communication formats, the customer (e.g., operating a customer computing entity 110) can provide the corresponding electronic destination addresses to be used in providing information/data associated with the notification/message services to the customer (e.g., email addresses, online handles, phone numbers, usernames, etc.). For instance, for text notifications/messages, the customer may provide one or more cellular phone numbers. For email notifications/messages, the customer may provide one or more email addresses. And for voice notifications/messages, the customer may provide one or more cellular or landline phone numbers or other electronic destination addresses to which audio files can be delivered. Additionally, in one embodiment, validation operations can be performed with respect to each input electronic destination address—to ensure accuracy. As will be recognized, a variety of other types of electronic destination addresses can be used to adapt to various needs and circumstances.

In one embodiment, as indicated in Block 505 of FIG. 5, device/entity information/data, customer information/data, physical address or location information/data, and/or the like (customer computing entities 110, carrier personnel computing entities 115, vehicles 100, and/or the like) may be received, provided, obtained, detected, assigned, collected, requested, and/or similar words used herein interchangeably as part of the registration/enrollment process. As will be recognized, device/entity information/data may be collected for any number of devices or entities for association with a customer's account, subscription, program, and/or similar words used herein interchangeably. The device/entity information/data may include one or more entity or device identifiers—phone numbers, Subscriber Identity Module (SIM) numbers, Media Access Control (MAC) addresses, International Mobile Subscriber Identity (IMSI) numbers, Internet Protocol (IP) addresses, Mobile Equipment Identifiers (MEIDs), unit identifiers (e.g., GPS unit identifiers, Unique Device Identifiers (UDiDs)), mobile identification numbers (MINs), IMSI_S (Short IMSIs), email addresses, usernames, Globally Unique Identifiers (GUIDs), Integrated Circuit Card Identifiers (ICCIDs), electronic serial numbers (ESN), International Mobile Equipment Identities (IMEIs), Wi-Fi IDs, RFID tags, and/or the like. The device/entity information/data may include a device's vendor, model, specification authority, version, components, software specification and/or version, person associated with the device, and/or the like. The device/entity information/data may be used to track, monitor, connect with, communicate with, and/or the like the corresponding devices or entities.

In one embodiment, with the appropriate information/data, the carrier computing system 105 may create a customer profile for the customer via the enrollment/registration process. Accordingly, the carrier computing system 105 may create, store, and/or have access to various customer profiles and/or information/data associated with the customer profiles. In addition to at least the information/data described above, a customer profile may include one or more corresponding usernames, passwords, images, tokens, challenge phrases, reminders, and/or the like (referred to herein as credentials) for accessing accounts, applications, services, entities, and/or the like. As will be recognized, a variety of other approaches and techniques can be used to adapt to various needs and circumstances.

In one embodiment, a customer profile identifier may be used to uniquely identify a customer profile. In another embodiment, a customer profile identifier may be used to uniquely identify a given address associated with a customer profile. In such an embodiment, if a customer profile is associated with four addresses, the carrier computing system 105 may create and store four customer profile identifiers in association with the customer profile. The customer profile identifier may also be stored in association with shipping information/data for an item to associate the item (and its shipping information/data) with the (a) correct customer (e.g., customer profile) and/or (b) correct address for a customer. Moreover, the carrier computing system 105 can associate shipping information/data for an item 103 with the corresponding customer profile. This may include appending the shipping information/data with the appropriate customer profile identifier (or other identifier corresponding to the customer profile). For instance, the shipping information/data for all shipments corresponding to Smith Co. Automotive's customer profile may be appended with the customer profile identifier (or other identifier) created for Smith Co. Automotive. In various embodiments, using this approach allows items (and their shipping information/data) to be linked to appropriate customer profiles. Thus, when a user at Smith Co. Automotive accesses its account, he or she can view all of his shipments (e.g., those shipments with shipping information/data appended with his customer profile identifier (or other identifier)). Similarly, any actions selected by the customer for an item can be passed to the shipping information/data for the item.

Customer-Defined Configurable/Determinable Parameters

In one embodiment, once a customer profile has been created by the carrier computing system 105, the customer (e.g., operating a customer computing entity 110) can define, identify, provide, and/or similar words used herein interchangeably one or more configurable/determinable parameters to be used in association with the customer's account, subscription, and/or program (Block 510 of FIG. 5). For instance, the customer can define one or more configurable/determinable parameters to be used in association with specific events/actions and/or messages/notifications. For example, the customer (e.g., operating a customer computing entity 110) can define the entities to which connections must be established to (a) generate a notification/message to the customer or to a carrier pick-up/delivery person (and/or various other parties), (b) automatically allow or disallow delivery or pick-up of an item 103, (c) confirm that an item 103 was picked up or delivered, and/or (d) the like. For example, a customer (such as a commercial warehouse or dock of a retail store) can define the configurable/determinable parameters to require that a connection or communication be established with any number of registered customer computing entities 110 (e.g., operated by warehouse or dock personnel). This approach may allow for customers to control deliveries when they or their personnel are within a configurable distance or range of an item 103 being delivered or the person delivering the item 103. As will be recognized, a variety of other approaches and techniques can be used to adapt to various needs and circumstances.

Carrier-Defined Configurable/Determinable Parameters

Similarly, once a customer profile has been created by a carrier computing system 105, the carrier computing system 105 can provide one or more configurable/determinable parameters to be used in association with the customer's account, subscription, and/or program (Block 510 of FIG. 5). For example, a carrier computing system 105 can define one or more configurable/determinable parameters (e.g., configurable levels) to be used in association with specific events/actions and/or messages/notifications. As noted, in one embodiment, each event may be associated with its own configurable/determinable parameters. In another embodiment, all events may be associated with the same configurable/determinable parameters.

In various embodiments, the configurable/determinable parameters can define the entities to which connections must be established to (a) generate a notification/message to the customer or to a carrier pick-up/delivery person (and/or various other parties), (b) automatically allow or disallow delivery or pick-up of an item 103, (c) confirm that an item 103 was picked up or delivered, and/or (d) the like. For example, in one embodiment, in the pick-up and delivery context, certain serviceable points (e.g., pick-up and/or delivery locations) and/or geographic areas may be referred to as non-driver release stops or non-driver release areas. Non-driver release stops/areas are stops/areas in which a carrier pick-up/delivery person may not leave an item 103 unclaimed and/or unattended as part of delivery. To identify such stops/areas, historical delivery information/data may be analyzed or the type of stop may be defined (e.g., commercial vs. residential). For such stops/areas, carrier pick-up/delivery persons are typically required to obtain an actual signature of the consignee or recipient. In one embodiment, carrier efficiency in non-driver release stops/areas can be increased by not requiring return trips in the event a consignee or recipient is unavailable to sign for an item 103. For example, the carrier computing system 105 can define the registered customer computing entities 110 with which a connection can be established to trigger a specific event/action—such as automatically allowing or disallowing delivery of an item, initiating shipment of an item, initiating movement of an item, generating shipping information/data, and/or the like. If the specified configurable/determinable parameters are satisfied, a carrier pick-up/delivery person can release the item 103 for delivery and reduce the number of delivery attempts at the delivery address. As will be recognized, a variety of other approaches and techniques can be used to adapt to various needs and circumstances.

Exemplary Configurable/Determinable Parameters

FIG. 6 provides exemplary configurable/determinable parameters to help in understanding embodiments of the present invention. In FIG. 6, three different examples are provided for attempted deliveries without requiring an actual signature for Smith Co. Automotive located at 101 Main Street, Anytown, Ga. 11111. Such configurable/determinable parameters solve the technical problem of confirming one's visit to a location without requiring human interaction. In these examples, the configurable/determinable parameters define the events, the locations, applicable days, applicable times, and the entities with which connections can be established.

The first set of configurable/determinable parameters define the entities with which connections can be established or communications can occur for deliveries on Monday-Friday between 9:00 am-6:00 pm at the warehouse dock. In this example, if an appropriate carrier computing entity (e.g., the carrier personnel computing entity 115 or the vehicle) can establish a connection or communication with the any registered employee's mobile device or John Smith's mobile device, the corresponding item can be released for delivery at the warehouse dock without an actual signature (but use the electronic signature stored via the profile).

The second set of configurable/determinable parameters define the entities with which connections can be established or communications can occur for deliveries on Monday-Friday between 6:01 pm-8:59 am at the front door. In this example, if an appropriate carrier computing entity (e.g., the carrier personnel computing entity 115 or the vehicle) can establish a connection or communication with John Smith's mobile device, the corresponding item can be released for delivery at the front door without an actual customer signature (using the electronic signature stored via the profile).

And the third set of configurable/determinable parameters define the entities with which connections can be established or communications can occur for deliveries on Saturday or Sunday (all day) at the front door. In this example, if an appropriate carrier computing entity (e.g., the carrier personnel computing entity 115 or the vehicle) can establish a connection or communication with John Smith's mobile device, the corresponding item can be released for delivery at the front door without a signature. As will be recognized, a variety of other approaches and techniques can be used to adapt to various needs and circumstances.

2. Connections/Communications

As will be recognized, certain communication technologies and protocols have range limitations for directly connecting to and/or directly communicating with computing entities (e.g., point-to-point, peer-to-peer, WLAN, WPAN, and/or the like). For example, various Bluetooth technologies may have range limitations from 20 feet to 300 feet. NFC technologies may have range limitations of less than 12 inches. Wi-Fi Direct may have range limitations of 600 feet. Thus, depending on the application or context, various communication technologies and protocols can be used to adapt to various needs and circumstances. For instance, NFC, Wi-Fi Direct, or Bluetooth technologies may be used to determine/identify whether a person or computing entity is present at a delivery location to determine whether an item should be allowed or disallowed for delivery. As will be recognized, a variety of other approaches and techniques can be used to adapt to various needs and circumstances.

In one embodiment, an appropriate computing entity can determine whether an item should be allowed or disallowed for delivery when carrier personnel computing entities 115 or vehicles 100 connect to or communicate with registered customer computing entities 110. For instance, in the Bluetooth context, a customer computing entity 110 can connect with multiple devices simultaneously with each device being within a 30-foot radius. In essence, Bluetooth systems create personal-area networks (PANS) or piconets that may fill an area, room, or vehicle. To create a connection between a customer computing entity 110 and a carrier personnel computing entity 115, a trusted relationship is established between the devices using credential information/data (e.g., passwords and/or other credentials) that can be stored by each device for future connection attempts (e.g., the devices are paired). After computing entities have been paired or credential information/data stored, establishing a connection begins with a phase called "inquiry" through which a carrier personnel computing entity 115 sends an inquiry request to all customer computing entities 110 found within its range. The customer computing entities 110 within range would then receive the query and reply. The carrier personnel computing entity 115 then synchronizes with the various customer computing entities 110 within range. Once the computing entities are connected (e.g., a connection is established) or communicate, an appropriate computing entity can determine whether an item should be allowed or disallowed for delivery and can provide notifications/messages regarding the same. As will be recognized, other communication technologies and protocols (e.g., NFC, Wibree, HomeRF, SWAP, Wi-Fi Direct, and/or the like) can be used in a similar manner in terms of connecting and disconnecting with carrier personnel computing entities 115. That is, the other communication technologies and protocols can communicate with or establish connections between customer computing entities 110 and carrier personnel computing entities 115.

In one embodiment, the monitoring computing entity 100 (and/or a variety of other computing entities) may perform connection-based monitoring regularly, periodically, continuously, during certain time periods or time frames, on certain days, upon determining the occurrence of one or more configurable/determinable triggers/events, combinations thereof, and/or the like (Block 515 of FIG. 4). For example, in the delivery context, the appropriate computing entity may continuously monitor connections or attempt to connect to registered entities using shipping information/data. In one embodiment, the carrier computing entity 105 (and/or a variety of other computing entities) may perform connection-based monitoring upon determining the occurrence of one or more configurable triggers/events, in response to requests, in response to determinations/identifications, combinations thereof, and/or the like. In one example, the connection-based monitoring can be initiated using a variety of different triggers—(a) a designated carrier vehicle 100 being turned on or off; (b) a designated carrier vehicle 100 beginning to move; (c) a designated carrier vehicle 100 slowing to a stop; (d) an entity moving out of a geofenced area; (e) an entity moving into a geofenced area; and/or a variety of other triggers/events. In one embodiment, the determining/identifying can be initiated in response to a request or determination, such as (a) a scan of an item 103 at a pick-up or delivery location (e.g., a carrier pick-up/delivery person operating a carrier personnel computing entity 115 to scan an item 103 and/or request instructions from the carrier computing entity 105); (b) a determination that an item 103 will be delivered in the next 5 or 10 minutes (configurable time period); (c) a determination that an item 103 is among the next 5 or 7 items 103 to be delivered (configurable number); and/or a variety of other requests or determinations. As will be recognized, a variety of other triggers/events can be used to adapt to various needs and circumstances. If a configurable/determinable trigger/event is not detected, an appropriate computing entity can determine/identify whether a configurable time period has begun or ended. If the appropriate computing entity determines/identifies that the configurable time period has not begun or ended, the appropriate computing entity can continue monitoring for configurable/determinable triggers/events. However, if the appropriate computing entity determines/identifies that the configurable time period has begun or ended, the appropriate computing entity (e.g., monitoring computing entity 100) can continuously monitor whether one or more customer computing entities 110 are connected to (e.g., communicating with) one or more carrier personnel computing entities 115. The monitoring may continue indefinitely, until the occurrence of one or more configurable/determinable triggers/events, until a configurable time period has elapsed, combinations thereof, and/or the like.

Continuing with the above example, a carrier pick-up/delivery person (operating a carrier personnel computing entity 115) can scan an item, read an item, interrogate an item, or communicate with an item that is to be delivered (Block 515 of FIG. 5). In another embodiment, it can be determined that item will be delivered within a configurable period of time (in the next 2, 5, or 10 minutes) or a configurable numbers of items (the next 5 or 7 items 103). In either case, the shipping information/data for the item can initiate a determination as to whether the pick-up or delivery of the item 103 should be allowed or disallowed. In one embodiment, to make this determination, the customer profile for the item can be accessed to identify any related configurable/determinable parameters for delivering the item 103. For example, the customer profile identifier in the shipping information/data can be used to identify and access the corresponding profile (e.g., the customer identifier maps or resolves to the profile). Then, using the profile, an appropriate computing entity can identify/determine any related configurable/determinable parameters for delivering the item 103 (Block 520 of FIG. 5). In another embodiment, any related configurable/determinable parameters for delivering the item 103 can be stored in association with the shipping information/data. With the configurable/determinable parameters for delivering the item 103, an appropriate computing entity can either (a) monitor for connections of customer computing entities 110 (Block 525A of FIG. 5) and/or (b) attempt to connect with one or more registered customer computing entities 110 (Block 525B of FIG. 5).

Generally, the connections between one or more customer computing entities 110 and/or one or more of the carrier personnel computing entities 115 can be attempted by or monitored by any of a variety of computing entities—including carrier computing systems 105, customer computing entities 110, carrier personnel computing entities 115, and/or the like. Continuing with the above example, an appropriate computing entity may determine/identify when a customer computing entity 110 and a carrier personnel computing entity 115 are connected or communicating with one another and satisfy the configurable/determinable parameters. For instance, after a carrier pick-up/delivery person (operating a carrier personnel computing entity 115) scans, reads, interrogates, or communicates with an item 103, using the registered customer computing entity 110 information, the carrier personnel computing entity 115 can monitor for connections to or attempt to connect to one or more customer computing entity 110 associated with the item 103 using the device information/data previously collected or obtained. Alternatively or additionally, the carrier personnel computing entity 115 can determine/identify whether the configurable/determinable parameters are satisfied (e.g., day, time, location, and devices) to allow or disallow delivery of the corresponding item (Block 530 of FIG. 5).

If the configurable/determinable parameters are satisfied (e.g., day, time, location, and connected devices), the item 103 can be allowed for delivery. In this example, an appropriate computing entity can allow the delivery and provide a notification/message to the carrier personnel computing entity 115 for display via the interface regarding the same (see FIG. 7). Otherwise, the appropriate computing entity will disallow the delivery and provide a notification/message to the carrier personnel computing entity 115 regarding the same (see FIG. 8).

Responsive to allowing or disallowing delivery of an item, the carrier personnel computing entity 115 indicate or provide an indication of the same ((e.g., that the carrier personnel computing entity 115 is connected to the customer computing entity 110 for John Smith)—Blocks 535 and 540 of FIG. 5). The indication may include device or entity information/data associated with the corresponding customer computing entity 110 and/or carrier personnel computing entity 115, such as the corresponding device identifiers and names. The indication may also include other information/data, such as the location at which the entities connected (e.g., geocode or GPS samples), the time at which the entities connected, and/or the like. The appropriate computing entity can then store the information/data in one more records and/or in association with the account, subscription, program, shipping information/data, and/or the like. The information/data can also be stored in association with tracking information/data for the item 103. This may include storing the electronic signature from the customer's profile in association with the shipping information/data for the item 103. That is, the connection can serve as an electronic signature by the customer, and the electronic signature can then be stored accordingly with the shipping information/data.

The appropriate computing entity can also provide notifications/messages in accordance with users' notification/message preferences. For example, the carrier computing system 105 (and/or other appropriately configured computing entities) can automatically provide (e.g., generate, queue, and/or transmit) one or more notifications/messages based on the configurable/determinable parameters for a given account (messages to both consignors and/or consignees). For example, the carrier computing system 105 (and/or other appropriately configured computing entities) can automatically provide the notifications/messages to the electronic destination addresses regarding items that have been picked-up or delivered or have been attempted to be picked-up or delivered. As will be recognized, this may include generating, queuing, and/or transmitting an email message to a customer's email address, a text message to a customer's cellular phone, a notification/message to a designated application, and/or the like based on the configurable/determinable parameters. As will be recognized, a variety of types of messages can be provided to various electronic destination addresses in response completing or attempting pick-ups or deliveries. Such notifications/messages may include links or access to shipping information/data and/or the real time location of the item 103. The links or access to information/data sources may be used to provide real-time location information/data of the corresponding carrier personnel computing entity 115. Such notifications/messages can be provided on a periodic or regular basis and/or in response to certain triggers/events.

IV. CONCLUSION

Many modifications and other embodiments of the inventions set forth herein will come to mind to one skilled in the art to which these inventions pertain, having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
causing a connection to be established between a first computing entity and a second computing entity based on credential information;
based on the connection being established, causing a synchronization of the first computing entity and the second computing entity, wherein at least one of: the synchronization or the connection allows for communication between the first computing entity and the second computing entity;
determining that one or more triggering events have occurred, wherein the one or more triggering events comprise one or more of: (1) a designated carrier vehicle turning on or off, (2) the designated carrier vehicle beginning to move, and (3) the designated carrier vehicle slowing to a stop;
in response to the determining, monitoring the connection between the first computing entity and the second computing entity on a pre-determined schedule;
determining whether to allow delivery or pickup of an item based at least in part on the monitoring of the connection and the determining that the one or more triggering events have occured; and based on allowing the delivery or pickup of the item, causing presentation, via a user interface, of a notification for display indicating that the item is allowed to be delivered or picked up.

2. The method of claim 1, wherein the credential information includes user profile information that includes one or more of: a username, a password, an image, a token, a challenge phrase, and a reminder.

3. The method of claim 1, wherein the synchronization includes:
   causing an inquiry request to be sent to all customer computing entities found within a range of the first computing entity, wherein the second computing entity is included in all customer computing entities; and
   causing synchronization with a plurality of customer computing entities that are within the range of the first computing entity, and wherein the second computing entity is within the range of the first computing entity.

4. The method of claim 1, wherein the one or more triggering events further include one or more of: an entity moving out of a geofenced area, the entity moving into the geofenced area, a scan of the item at a pick-up or delivery location, a determination that the item will be delivered within a configurable time period, and a determination that the item is among a next configurable number of items to be delivered.

5. The method of claim 1, further comprising storing a time and a location at which the first computing entity and the second computing entity established the connection.

6. The method of claim 1, further comprising:
   receiving, via the connection and during a predetermined time period, one or more configurable parameters for one or more deliveries without human interaction; and
   automatically disallowing or allowing delivery or pick-up of the item, and confirming the item was picked-up or delivered.

7. The method of claim 6, wherein the one or more configurable parameters are selected from a group consisting of a location, a day, and a time.

8. An apparatus comprising at least one processor and at least one memory including program code, the at least one memory and the program code configured to, with the at least one processor, cause the apparatus to at least:
   cause a connection to be established between a first computing entity and a second computing entity based on credential information, wherein the connection is at least partially responsible for allowing communication between the first computing entity and the second computing entity;
   determine that one or more triggering events have occurred, wherein the one or more triggering events comprises one or more of: (1) an entity moving out of a geofenced area, (2) the entity moving into the geofenced area, (3) a scan of an item at a pick-up or delivery location, (4) a determination that the item will be delivered within a configurable time period, and (5) a determination that the item is among a next configurable number of items to be delivered;
   in response to the determining, monitor the connection between the first computing entity and the second computing entity on a pre-determined schedule;
   determine whether to allow delivery or pickup of the item based at least in part on the monitoring of the connection and the determining that the one or more triggering events have occured; and
   based on allowing or not allowing the delivery or pickup of the item, causing presentation, via a user interface, of a notification for display indicating that the item is allowed or not allowed to be delivered or picked up.

9. The apparatus of claim 8, wherein the credential information includes user profile information that includes one or more of: a username, a password, an image, a token, a challenge phrase, and a reminder.

10. The apparatus of claim 8, wherein the apparatus is further caused to:
    cause an inquiry request to be sent to all customer computing entities found within a range of the first computing entity, wherein the second computing entity is included in all customer computing entities; and
    cause synchronization with a plurality of customer computing entities that are within the range of the first computing entity, and wherein the second computing entity is within the range of the first computing entity.

11. The apparatus of claim 8, wherein the one or more triggering events further include one or more of: a designated carrier vehicle turning on or off, the designated carrier vehicle beginning to move, and the designated carrier vehicle slowing to a stop.

12. The apparatus of claim 8, wherein the apparatus is further caused to store a time and a location at which the first computing entity and the second computing entity established the connection.

13. The apparatus of claim 8, wherein the apparatus is further caused to:
    receive, via the connection during a predetermined time period, one or more configurable parameters for one or more deliveries without human interaction; and
    automatically disallowing or allowing delivery or pick-up of the item.

14. The apparatus of claim 13, wherein the one or more configurable parameters are selected from a group consisting of a location, a day, and a time.

15. A computer program product comprising at least one non-transitory computer-readable storage medium having computer-readable program code portions stored therein, the computer-readable program code portions comprising:
    an executable portion configured to cause a connection to be established between a first computing entity and a second computing entity, wherein the connection is at least partially responsible for allowing communication between the first computing entity and the second computing entity;
    an executable portion configured to monitor the connection and determine that one or more triggering events have occurred, wherein the one or more triggering events comprises one or more of: (1) a scan of an item at a pick-up or delivery location, (2) a determination that the item will be delivered within a configurable time period, (3) a determination that the item is among a next configurable number of items to be delivered, (4) a designated carrier vehicle turning on or off, (5) the designated carrier vehicle beginning to move, and (6) the designated carrier vehicle slowing to a stop;
    an executable portion configured to determine whether to allow delivery or pickup of the item based at least in part on the monitoring of the connection and the determining that the one or more triggering events have occurred; and
    an executable portion configured to cause presentation, via a user interface, of a notification for display indicating that the item is allowed or not allowed to be delivered or picked up based on allowing or not allowing the delivery or pickup of the item.

16. The computer program product of claim 15, wherein the connection is established based on credential information that includes one or more of: a username, a password, an image, a token, a challenge phrase, and a reminder.

17. The computer program product of claim 15, wherein computer-readable program code portions further comprise an executable portion configured to cause a synchronization of the first computing entity and the second computing entity.

18. The computer program product claim 17, wherein the computer-readable program code portions further comprise:
an executable portion configured to cause an inquiry request to be sent to all customer computing entities found within a range of the first computing entity, wherein the second computing entity is included in all customer computing entities; and
an executable portion configured to cause synchronization with a plurality of customer computing entities that are within the range of the first computing entity, and wherein the second computing entity is within the range of the first computing entity.

19. The computer program product of claim 15, wherein the computer-readable program code portions further comprise an executable portion configured to store a time and a location at which the first computing entity and the second computing entity established the connection.

20. The computer program product of claim 15, wherein the computer-readable program code portions further comprise an executable portion configured to:
receive, via customer input at the second computing entity and via the connection, one or more configurable parameters for one or more deliveries during a predetermined time period, and
automatically disallow or allow delivery or pick-up of the item.

* * * * *